United States Patent [19]

King

[11] 4,444,637

[45] Apr. 24, 1984

[54] ELECTRICAL TREATING APPARATUS HAVING ELECTRODE CLEANER

[76] Inventor: Arthur S. King, 8021 Cherokee La., Leawood, Kans. 66206

[21] Appl. No.: 489,333

[22] Filed: Apr. 28, 1983

[51] Int. Cl.³ .............................................. B03C 5/02
[52] U.S. Cl. ..................................... 204/212; 204/304
[58] Field of Search ............... 204/212, DIG. 10, 302, 204/304

[56] References Cited

U.S. PATENT DOCUMENTS

| | | | |
|---|---|---|---|
| 313,569 | 3/1885 | Appleton | 204/DIG. 10 |
| 1,473,060 | 11/1923 | Taylor | 204/DIG. 10 |
| 3,706,650 | 12/1972 | Eisner | 204/DIG. 10 |
| 4,242,190 | 12/1980 | King | 204/212 |
| 4,242,192 | 12/1980 | Dunning, Jr. | 204/212 |

FOREIGN PATENT DOCUMENTS 18643 of 1899 United Kingdom ....... 204/DIG. 10

Primary Examiner—T. Tufariello
Attorney, Agent, or Firm—Schmidt, Johnson, Hovey & Williams

[57] ABSTRACT

The treater includes a rotating, immersed electrode within the treating chamber, and a scrubbing member in contact with the rotating electrode for cleaning unwanted deposits from the electrode. In one form of the invention, a rotating cylindrical scrubbing member is positioned in counter-moving relationship with the rotating electrode at the point of contact therewith. In another form of the invention a stationary scrubbing member is adjustably spring biased into contacting relationship with the rotating electrode.

6 Claims, 8 Drawing Figures

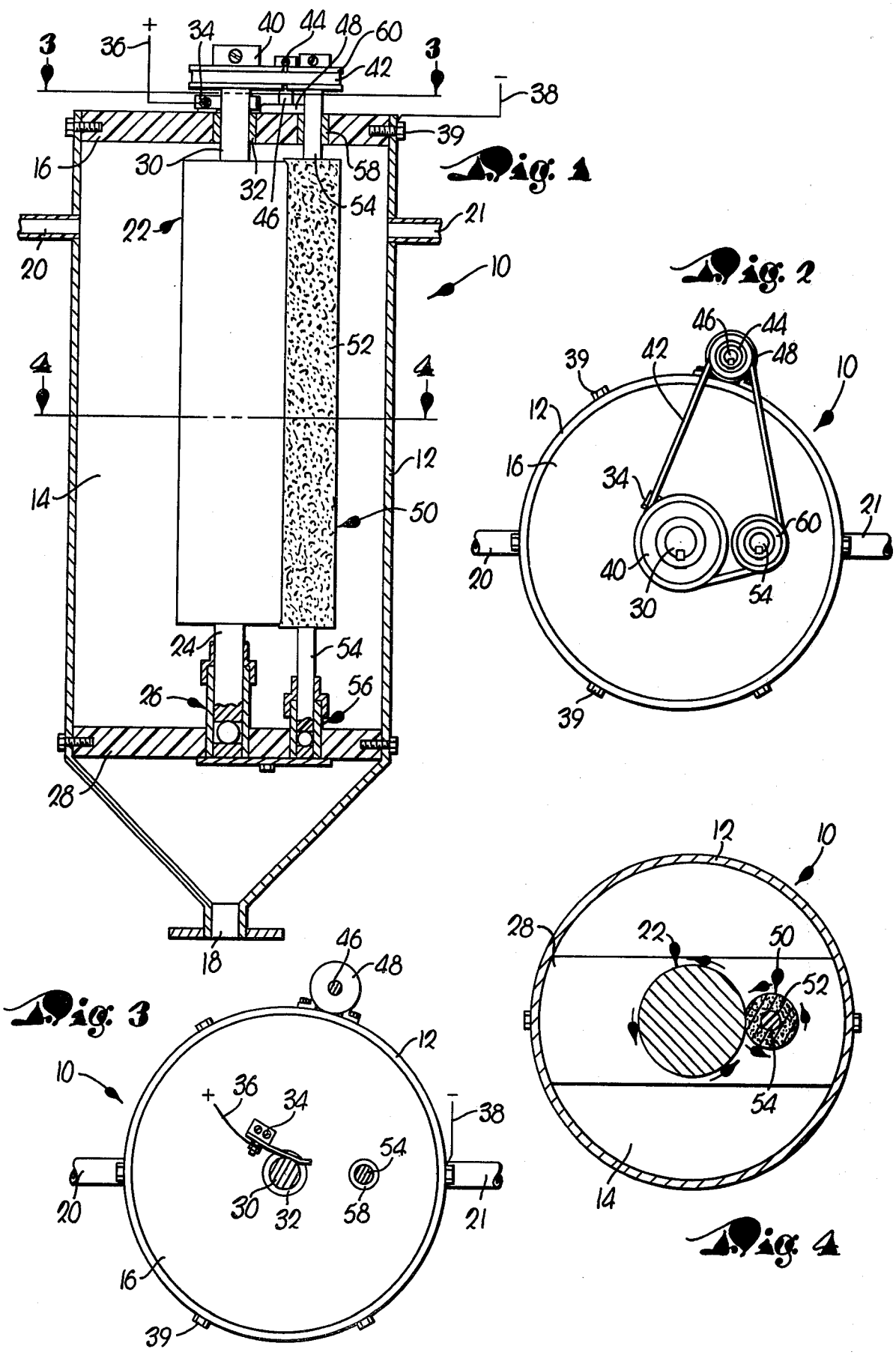

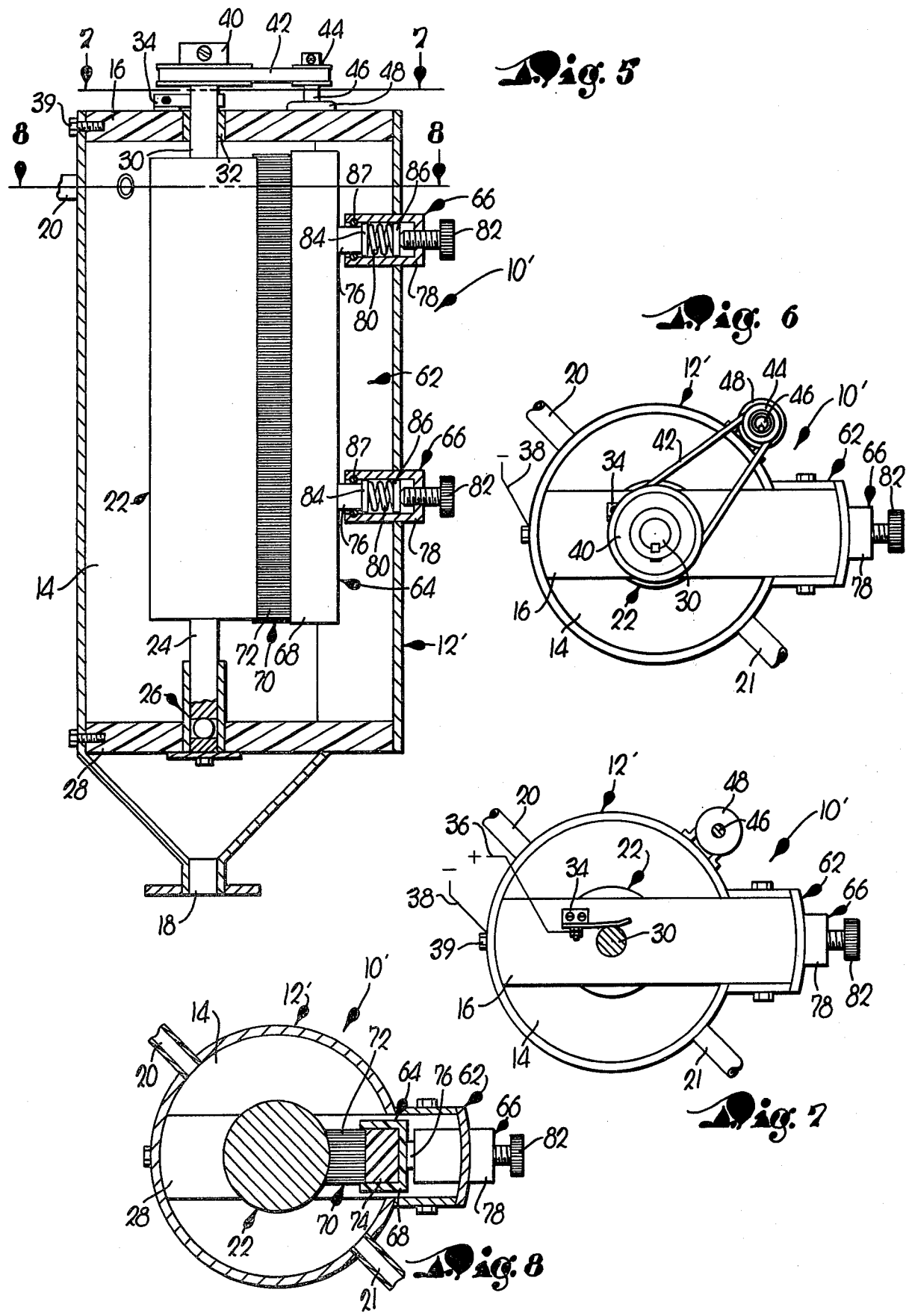

ELECTRICAL TREATING APPARATUS HAVING ELECTRODE CLEANER

TECHNICAL FIELD

This invention relates to the treatment of fluids by electrical means and, more particularly, to an arrangement for keeping at least one of the electrodes of such a treater clear of deposits that would otherwise impede or inhibit proper electrodic action.

BACKGROUND ART

There is a tendency during electrodic action for deposits to build up along the outer surface of at least one of the electrodes of an electric treater, such deposits inhibiting the electrodic action. Moreover, dipole water molecules, in the case of a liquid containing water, have a tendency to form a layer around the positively charged electrode during treatment, such layer also inhibiting proper electrodic action because it obstructs free access of impurity particles in a liquid to the electrode. The build up of deposits is especially deleterious in instances where it would otherwise be advantageous to use an aluminum anode.

The problems associated with keeping a rotating electrode in a liquid treater free from unwanted deposits have been previously addressed by my U.S. Pat. No. 4,242,190 of Dec. 30, 1980 entitled "Rotary Electrodic Treater With Jet Action Cleaning", and 4,292,163 of Sept. 29, 1981 entitled "Liquid Treater Having Electrode Stripper". U.S. Pat. No. 4,292,163 discloses an electolytic treater wherein a rotating, horizontally oriented anode is specifically designed so as not to be immersed in the fluid being treated. The anode is provided with a plate-like stripper for removing adhering water molecules and reacted products from the surface of the anode. U.S. Pat. No. 4,242,190 discloses an electrodic treater having a rotating, vertically oriented anode designed for immersion in the fluid being treated. The cathode of the treater is configured as an elongated inlet nozzle directed towards the rotating anode so that the anode is cleaned by the jet action of the liquid issuing from the nozzle-shaped cathode.

Notwithstanding the contributions of the above-mentioned patents to the electrodic liquid treater art, there has heretofore been no attempt to provide a contact scrubbing member for use with an electrodic treater having a rotatable, liquid-immersed anode.

SUMMARY OF THE INVENTION

Accordingly, it is an object of the present invention to provide a contact-scrubbing member for an electrical treating apparatus having a rotating, immersed anode. In one embodiment of the invention, a cylindrical, dielectric scrubbing member is mounted in contacting, parallel relationship with the rotating anode. Drive means are applied to the scrubbing member for counter-rotating the scrubbing member relative to the rotating anode. In a second embodiment, the invention hereof includes an elongated, stationary dielectric scrubbing member that is spring-biased into contacting relationship with the rotating anode of an electric treater. The biasing mechanism includes an adjustment assembly for varying the force with which the scrubbing member is biased against the anode.

BRIEF DESCRIPTION OF THE DRAWINGS

FIG. 1 is a longitudinal sectional view of an electrical treating apparatus having an electrode cleaner in accordance with the present invention mounted therein;

FIG. 2 is a plan view of the electrical treating apparatus;

FIG. 3 is a sectional view taken along the line 3—3 of FIG. 1;

FIG. 4 is a sectional view taken along the line 4—4 of FIG. 1;

FIG. 5 is a longitudinal sectional view of an electrical treating apparatus having a second embodiment of an electrode cleaner in accordance with the present invention therein;

FIG. 6 is a plan view of the electrical treating apparatus depicted in FIG. 5;

FIG. 7 is a sectional view taken along the line 7—7 of FIG. 5; and

FIG. 8 is a sectional view taken along the line 8—8 of FIG. 5.

DETAILED DESCRIPTION

The treater 10 includes a tank 12 having an internal treating chamber 14, the tank 12 having a cap 16 closing its otherwise open upper end, and having an outlet 18 at its lower end. Supply line 20 and overflow line 21 are provided in the side of the tank 12.

Concentrically disposed within the cylindrical tank 12 is a cylindrical electrode 22 formed of any suitable conductive material but which may advantageously be carbon or aluminum. The electrode 22 has a lower reduced diameter shaft 24 received within a bearing assembly 26 which is in turn supported within the chamber 14 by a transverse bar 28, and a second reduced diameter shaft 30 projects from the upper end of the electrode 22 through a bushing 32 in the cap 16. Thus, the bushing 32 and the bearing assembly 26 adapt the electrode 22 for rotation about the upright, longitudinal axis of the latter. The bushing 32 and the bearing assembly 26 are either constructed of or are otherwise provided with suitable dielectric material so as to electrically insulate the electrode 22 from the tank 12.

The upper shaft 30 projects upwardly beyond the cap 16 for a distance and is contacted by an electrical contact 34 which bears against the shaft 30 during rotation of the electrode 22 so as to maintain electrical continuity between the latter and a lead 36 leading from the contact 34 to a source of electrical potential, the lead 36 preferably being connected to the positive side of such source so as to render the electrode 22 positively charged. The negative side of the electrical potential source is connected to the casing of tank 12 via lead 38. The lead 38 is secured to the tank 12 by any one of a number of cap security bolts 39.

A sheave 40 affixed to the upermost end of the shaft 30 is entrained by a belt 42 which in turn entrains a second sheave 44 affixed to the output shaft 46 of a suitable motor 48. This arrangement provides driving power for the electrode 22, and the motor 48 may conveniently be mounted directly onto the side of the tank 12 if such is desired.

A generally cylindrical scrubbing member 50 is positioned in parallel, contacting relationship with the anode 22. The scrubbing member includes a sleeve of scrubbing material 52 positioned on a shaft 54. The scrubbing material may either be of metal or a suitable synthetic resin. The lower portion of the shaft 54 is received within bearing assembly 56, and the upper portion of the shaft 54 projects through a bushing 58 in the cap 16. Thus, the bushing 58 and the bearing assembly 56 adapt the scrubbing member 50 for rotation about the upright, longitudinal shaft 54. The bushing 58 and the bearing assembly 56 are either constructed of or are otherwise provided with suitable dielectric material so as to electrically insulate the scrubbing member 50 from the tank 12.

A sheave 60 is affixed to the uppermost end of the shaft 54 and is entrained by the before-mentioned belt 42 together with the sheaves 40, 44.

Referring to FIGS. 5 through 8, an alternative embodiment of an electrode cleaner in accordance with the present invention will now be described. The electrical treating apparatus depicted in FIGS. 5 through 8 is similar in many respects to that described and depicted in FIGS. 1 through 4, and where possible, like numbers have been assigned to like structural features of the two electrical treating apparatus.

The tank 12' is similar to the tank 12 depicted in FIGS. 1 through 4, but includes outwardly extending walls defining a longitudinally extending chamber 62 having an open face directed towards the treating chamber 14.

An elongated scrubbing member 64 is positioned within chamber 62, and is biased towards the anode 22 by biasing assemblies 66. Scrubbing member 64 includes a preferably synthetic resin casing 68, within which is received elongated brush 70. Brush 70 includes a plurality of bristles 72 embedded in base member 74. The bristles 72 may either be metallic or a suitable synthetic resin. In any case, either the casing 68, the bristles 72, or both must be of a suitable dielectric material such that the scrubbing member 64 does not provide an electrically conducting path between the anode 22 and casing 12'.

Cylindrical supports 76 project outwardly from the scrubbing member casing 68, and are received within respective biasing assemblies 66. Biasing assemblies 66 each include a tubular receptacle 78 for receiving respective supports 76, a spring 80, and an adjustment screw 82. The springs 80 are interposed between a flange 84 mounted on the supports 76, and a backing plate 86. O-rings 87 provide a fluid tight seal between the supports 76 and the recepticles 78.

The supply line 20 and overflow line 21 are preferably of dielectric material or are otherwise insulated in a suitable manner from the casing of tank 12. The supply line 20 is connected at its upstream end to a source (not shown) of liquid to be treated, and thus serves as a means for supplying such liquid into the treating chamber 14.

In operation, fluid is directed into the chamber 14 via supply line 20, and the chamber 14 will fill to the level of the overflow line 21. Leads 36, 38 are connected across a source of electrical potential, thereby subjecting the fluid within chamber 14 to an electric field. Concurrent with the testing of the fluid in the presence of an electric field, a continuous layer of unwanted deposits will be formed on the surface of the anode 22. The thickness of the deposit layer may equal one or more atomic diameters, but the formation of three-dimensional surface compounds is also possible. The formation of a layer of unwanted deposits on the anode 22 will have a deleterious effect on the treatment process. Not only will the treating action be diminished by the formation of deposits on the anode, the presence of the layer makes it difficult to achieve consistent results that are especially necessary when the electrical treating apparatus 10 or 10' are used as experimentation tools.

The scrubbing members of the respective embodiments of the invention act to continuously remove deposits that are formed on the surface of anode 22 during operation of the electrical treating apparatus. Referring in particular to FIGS. 2 and 4, it will be seen that the scrubbing material 52 of scrubbing member 50 is oppositely moved with respect to the anode 22 at the point of contact with the latter by action of the belt 42 entrained about the sheaves 40, 44 and 60 of the motor 48, anode 22, and scrubbing member 50 respectively. The scrubbing action of the material 52 against the anode 22 cleans each portion of the surface of anode 22 with each revolution of the anode 22.

Referring to FIGS. 5 through 8, it will be apparent that the scrubbing member 64 in accordance with the second embodiment of the invention will also clean each portion of the surface of anode 22 upon each revolution of the anode 22. Although the scrubbing member 70 remains stationary, it will be appreciated that the anode 22 is rotated by the entrainment of belt 42 about sheaves 40 and 44 of the anode 22 and electric motor 46 respectively. The bristles 72 of scrubbing member 64 are maintained in contacting relationship with the anode 22 by the biasing force applied to the scrubbing member 64 by springs 80. Rotation of the adjustment srews 62 shifts the backing plate 86 with respect to the tubular recepticle 78 of the biasing assembly 66, thereby allowing adjustment of the biasing force exerted on the scrubbing member 64 by the springs 80.

I claim:

1. Apparatus for electrically treating liquids comprising:

a container for liquid to be treated;

oppositely chargeable electrode means associated with said container, including an electrically conductive member received within the container in disposition for immersion within liquid to be treated;

means for connecting said electrode means across a source of electrical potential for oppositely charging the same and for producing an electric field within the container to which liquid to be treated may be exposed, said electrode means being so connected across said source of electrical potential as to cause said conductive member to function as a sacrificial anode when liquid to be treated is present in the container;

a scrubbing element mounted within said container in contacting engagement with said conductive member; and means for effecting relative rotation between said scrubbing element and said conductive member so as to progressively expose different portions of the surface of said member to said scrubbing element for removal of any deposits on the member tending to inhibit anodic sacrificial action.

2. An apparatus as claimed in claim 1, wherein said rotation means are coupled with said conducting member for rotation of said conducting member.

3. An apparatus as claimed in claim 2, wherein said scrubbing element is stationary, said element being provided with means for biasing the same into contacting engagement with said conducting member.

4. An apparatus as claimed in claim 3, said biasing means including means for selectively adjusting the degree of force with which said scrubbing element is biased toward said conducting member.

5. An apparatus as claimed in claim 2, wherein said scrubbing element is generally cylindrical and is mounted in contacting, generally parallel relationship with said conducting means, said rotation means being operable to rotate both said member and said element.

6. An apparatus as claimed in claim 5, wherein said rotation means is operable to drive said element in such a rotative direction relative to said member that the surface of said element and the surface of said member are moving in relatively opposite directions at their point of interengagement.

* * * * *